(12) United States Patent
Nakase et al.

(10) Patent No.: US 9,880,503 B2
(45) Date of Patent: *Jan. 30, 2018

(54) IMAGE FORMING APPARATUS THAT GENERATES CONVERSION CONDITION OF A MEASURING UNIT, AND CONTROL METHOD OF THE IMAGE FORMING APPARATUS

(71) Applicant: CANON KABUSHIKI KAISHA, Tokyo (JP)

(72) Inventors: Takahiro Nakase, Moriya (JP); Hayato Negishi, Toride (JP); Atsushi Hori, Kamagaya (JP); Keizo Takura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,963

(22) Filed: Mar. 17, 2016

(65) Prior Publication Data

US 2016/0282780 A1    Sep. 29, 2016

(30) Foreign Application Priority Data

Mar. 23, 2015  (JP) ................................. 2015-060145

(51) Int. Cl.
G03G 15/00  (2006.01)
H04N 1/024  (2006.01)
H04N 1/50   (2006.01)
H04N 1/407  (2006.01)

(52) U.S. Cl.
CPC ..... G03G 15/5058 (2013.01); G03G 15/5062 (2013.01); H04N 1/024 (2013.01); H04N 1/4078 (2013.01); H04N 1/50 (2013.01); H04N 1/506 (2013.01)

(58) Field of Classification Search
None
See application file for complete search history.

(56) References Cited

U.S. PATENT DOCUMENTS

| 6,982,812 B2 | 1/2006 | Johnson |
| 8,229,307 B2 | 7/2012 | Komiya |
| 2002/0134130 A1 | 9/2002 | Johnson |
| 2007/0172245 A1 | 7/2007 | Yoshida et al. |

(Continued)

*Primary Examiner* — Sevan A Aydin
(74) *Attorney, Agent, or Firm* — Canon U.S.A., Inc. IP Division

(57) ABSTRACT

An image forming apparatus includes: a correction unit correcting image data based on a correction condition; an image forming unit forming an image based on the corrected image data; a transfer unit transferring the image onto a sheet; a measuring unit measuring a measuring image on an image bearing member; a converting unit converting a measurement result of the measuring image, based on a conversion condition; a first generating unit generating the correction condition based on the converted measurement result; an acquiring unit acquiring a measurement result of a test image formed on the image bearing member; a controller forming a test image on the sheet; a receiving unit receiving instruction from a user comparison of a sample image and the test image transferred on the sheet; and a second generating unit generating the conversion condition, based on the instruction and the acquired measurement result of the test image.

13 Claims, 12 Drawing Sheets

(56) References Cited

U.S. PATENT DOCUMENTS

| | | | |
|---|---|---|---|
| 2008/0131152 A1 | 6/2008 | Komiya | |
| 2011/0211853 A1* | 9/2011 | Yamada | G03G 15/5058 399/49 |
| 2012/0269526 A1* | 10/2012 | Lee | G03G 15/0131 399/49 |
| 2015/0063843 A1 | 3/2015 | Saito | |

* cited by examiner

IMAGE FORMING APPARATUS THAT GENERATES CONVERSION CONDITION OF A MEASURING UNIT, AND CONTROL METHOD OF THE IMAGE FORMING APPARATUS

BACKGROUND OF THE INVENTION

Field of the Invention

The present invention relates to correction control for correction of characteristics of images formed by an image forming apparatus.

Description of the Related Art

Electrophotography type image forming apparatuses form images by forming an electrostatic latent image on a photosensitive member based on image data, and developing the electrostatic latent image using a developing agent (toner) within a developer unit. In order to control the density of an image formed by the image forming apparatus to a desired density, a measuring image formed by the image forming apparatus is measured, and correction condition is corrected based on the results of the measurement.

An image forming apparatus in U.S. Pat. No. 8,229,307 forms a measuring image on a photosensitive member, measures the measuring image formed on the photosensitive member by a sensor, and corrects the density of the image formed by the image forming apparatus based on the results of measurement by the sensor.

However, there has been the possibility that the density of the image formed on a sheet will not be the desired density even if the correction condition is corrected. This is due to measurement error of the sensor. In a case where there is error in the measurement results of the sensor, density of the image formed by the image forming apparatus cannot be corrected with high accuracy.

SUMMARY OF THE INVENTION

An image forming apparatus according to the present invention includes: a correction unit configured to correct image data based on correction condition; an image forming unit configured to form an image based on the corrected image data; an image bearing member configured to bear the image formed by the image forming unit; a transfer unit configured to transfer the image on the image bearing member onto a sheet; a measuring unit configured to measure a measuring image on the image bearing member; a converting unit configured to convert measurement results of the measuring image by the measuring unit, based on conversion condition; a first generating unit configured to generate the correction condition based on the measurement result converted by the converting unit; an acquisition unit configured to control the image forming unit to form a test image based on test image data, control the measuring unit to measure the test image on the image bearing member, and acquire measurement results of the test image by the measuring unit; a controller configured to control the image forming unit to form a test image based on test image data, and control the transfer unit to transfer the test image on the image bearing member into the sheet; a receiving unit configured to receive a user instruction based on a result of a user having compared a sample image and the test image transferred onto the sheet; and a second generating unit configured to generate the conversion condition, based on the user instruction received by the receiving unit, and the measurement results of the test image by the measuring unit that have been acquired by the acquisition unit.

Further features of the present invention will become apparent from the following description of embodiments with reference to the attached drawings.

DESCRIPTION OF THE EMBODIMENTS

Figure 1:
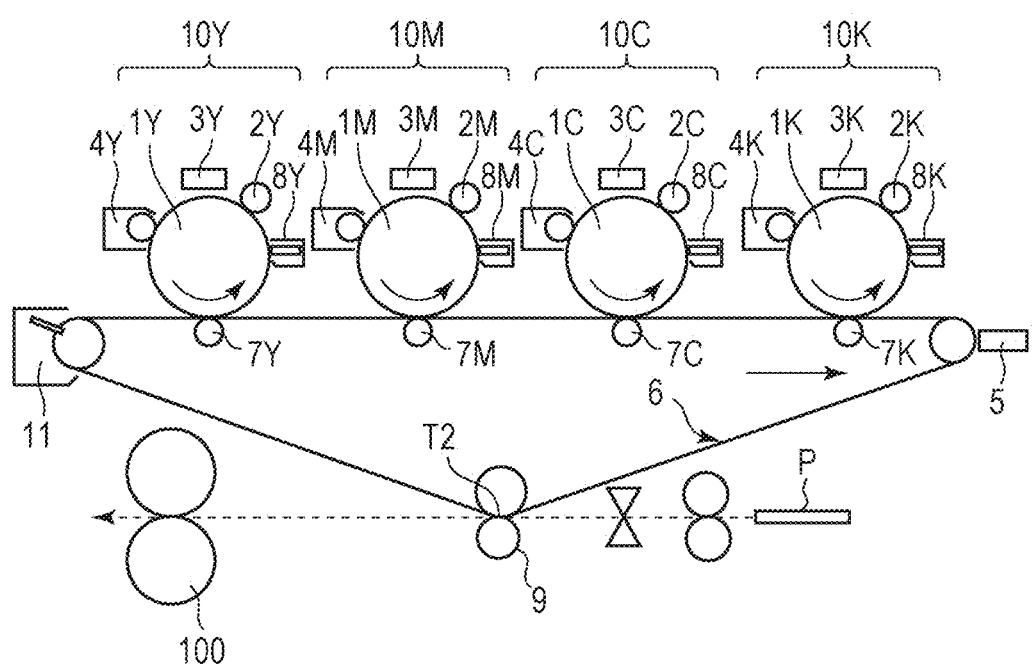
FIG. 1 is a schematic cross-sectional view of an image forming apparatus.

Each of the embodiments of the present invention described below can be implemented solely or as a combination of a plurality of the embodiments or features thereof where necessary or where the combination of elements or features from individual embodiments in a single embodiment is beneficial. FIG. 1 is a schematic cross-sectional diagram of an image forming apparatus that forms full-color images. The image forming apparatus has four image forming stations 10Y, 10M, 10C, and 10K, and forms images on sheets P. The image forming station 10Y forms yellow images, the image forming station 10M forms magenta images, the image forming station 10C forms cyan images, and the image forming station 10K forms black images. Images for each color component formed by the image forming stations 10Y, 10M, 10C, and 10K, are transferred overlaid onto an intermediate transfer belt 6, thereby forming a full-color image on the intermediate transfer belt 6. The full-color image on the intermediate transfer belt 6 is transferred onto a sheet. A fixing unit 100 fixes to the sheet the image on the sheet, and thereafter the sheet is discharged from the image forming apparatus.

The image forming stations 10Y, 10M, 10C, and 10K are each of the same configuration, other than developer units 4Y, 4M, 4C, and 4K accommodating toner of different color components. Hereinafter, the configuration of the yellow image forming station 10Y will be described, and description of the configuration of the other image forming stations 10M, 10C, and 10K will be omitted.

The image forming station 10Y has a photosensitive drum 1Y which has a photosensitive member formed on the surface thereof, a charger 2Y that has a charging roller connected to a high-voltage power source, an exposing device 3Y that exposes the photosensitive drum 1Y to form an electrostatic latent image, and the developer unit 4Y that develops the electrostatic latent image using toner. The image forming station 10Y further has a primary transfer roller 7Y facing the photosensitive drum 1Y across the later-described intermediate transfer belt 6, and a drum cleaner 8Y that recovers toner adhered to the photosensitive drum 1Y.

The intermediate transfer belt 6 is supported by multiple rollers, and is rotationally driven by a driving roller connected to a motor omitted from illustration. A secondary transfer roller pair 9 forms a secondary transfer nip T2 across the intermediate transfer belt 6. The sheet P is conveyed toward the secondary transfer nip T2. The secondary transfer roller pair 9 is connected to a power source unit (omitted from illustration). The power source unit applies secondary transfer voltage to the secondary transfer roller pair 9 while the sheet P is passing through the secondary transfer nip T2, whereby the image on the intermediate transfer belt 6 is transferred onto the sheet P at the secondary transfer nip T2. A belt cleaner 11 presses a plate-shaped elastic member against the intermediate transfer belt 6 and recovers toner on the intermediate transfer belt 6. A density detection sensor 5 measures a measuring image formed on the intermediate transfer belt 6. The density detection sensor 5 will be described later with reference to FIG. 4.

The fixing unit 100 has a pair of rollers to press the sheet and a heater for heating the sheet, and fixes an unfixed image on the sheet P onto the sheet P by heating while pressing the sheet P. The sheet P onto which the image has been fixed is output from the image forming apparatus.

Next, image forming operations of the image forming apparatus forming an image based on image data input from a PC or scanner or the like, omitted from illustration, will be described. The photosensitive drum 1Y in the image forming station 10Y is rotated in the direction indicated by an arrow by a motor omitted from illustration. The charger 2Y uniformly charges the photosensitive drum 1Y, and the exposing device 3Y exposes the photosensitive drum 1Y by exposure light. Accordingly, an electrostatic latent image corresponding to the yellow color component is formed on the photosensitive drum 1Y. The electrostatic latent image on the photosensitive drum 1Y is developed by the developer unit 4Y using yellow toner. A yellow image is formed on the photosensitive drum 1Y.

The yellow image on the photosensitive drum 1Y is conveyed to the primary transfer nip where the primary transfer roller 7Y presses the photosensitive drum 1Y across the intermediate transfer belt 6 in accordance with rotation of the photosensitive drum 1Y in the direction of the arrow. Primary transfer voltage is applied to the primary transfer roller 7Y from a power source unit (omitted from illustration). Accordingly, the yellow image on the photosensitive drum 1Y is transferred onto the intermediate transfer belt 6 at the primary transfer nip. The residual toner on the photosensitive drum 1Y is removed by the drum cleaner 8Y.

The images formed by the image forming station 10Y, 10M, 10C, and 10K, are transferred onto the intermediate transfer belt 6. Transferring the images overlaid into the intermediate transfer belt 6 forms a full-color image on the intermediate transfer belt 6. The image borne by the intermediate transfer belt 6 is conveyed to the secondary transfer nip T2. The sheet P is conveyed so that the image on the intermediate transfer belt 6 and the sheet P come into contact at the secondary transfer nip T2. The image on the intermediate transfer belt 6 is transferred into the sheet P by the secondary transfer roller pair 9 to which secondary transfer voltage is applied. Toner remaining on the intermediate transfer belt 6 without having been transferred onto the sheet P at the secondary transfer nip T2 is removed by the belt cleaner 11.

The sheet P bearing the image is conveyed to the fixing unit 100. The fixing unit 100 applies heat and pressure to the sheet P bearing the unfixed image, thereby fixing the unfixed image onto the sheet P by fusing.

Figure 2:
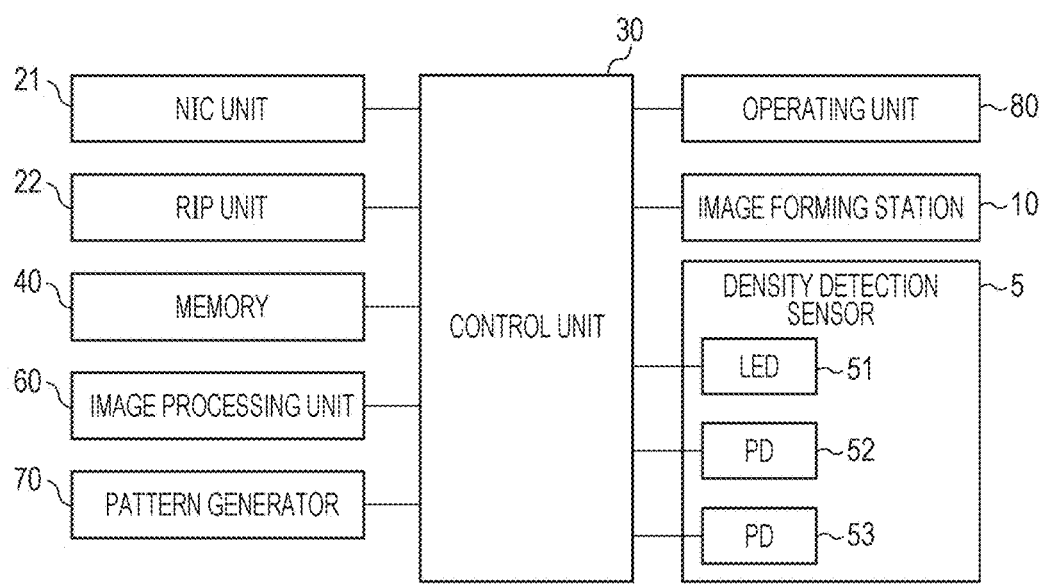
FIG. 2 is a control block diagram of an image forming apparatus.

Next, a control block diagram of the image forming apparatus will be described with reference to FIG. 2. A control unit 30 is a control circuit that controls each unit. Memory 40 stores a gamma look-up table (LUT), a conversion table Table_1 for converting sensor output values into density, and a conversion table Table_2 for correcting on-sheet density measured by the density detection sensor 5. The image forming station 10 corresponds to the image forming stations 10Y, 10M, 10C, and 10K in FIG. 1. The image forming station 10 has already been described, so description will be omitted here.

A network interface card (NIC) unit 21 transmits image data input via a network to a raster image processing (RIP) unit 22, and externally transmits apparatus information via a network. The RIP unit 22 analyzes image data described using a page description language (PDL), and renders image data.

An image processing unit 60 corrects image data by performing various types of image processing on image data. The image processing unit 60 may be realized by an integrated circuit such as an application-specific integrated circuit (ASIC), or may be realized by a central processing unit (CPU) of the control unit 30 correcting the image data based on a program stored beforehand.

An operating unit 80 has a power switch for the image forming apparatus, a mode selection button for selecting the mode of the image forming apparatus, a numeric keypad, an OK button, a liquid crystal screen, and so forth. The liquid crystal screen displays information relating to the remaining amount of toner accommodated in the developer units 4Y, 4M, 4C, and 4K, and displays images relating to image data.

The density detection sensor 5 includes a light-emitting diode (LED) 51 and photodiodes 52 and 53. The LED 51 irradiates light on the measuring image, and the density detection sensor 5 receives reflected light from the measuring image by the photodiodes 52 and 53. The photodiodes 52 and 53 of the density detection sensor 5 output sensor output values (voltage values) in accordance with intensity of the reflected light from the measuring image. The LED 51 functions as an irradiation unit to irradiate light into the measuring image. The photodiodes 52 and 53 function as photodetectors that receive the reflected light from the measuring image.

A pattern generator 70 generates image data for forming the measuring image. The pattern generator 70 outputs pattern image data in a case where a gradation correction mode to correct the gradation characteristics of the image forming station 10 is to be executed, and outputs test image data in a case where a visual adjustment mode to adjust a conversion table Table_2 is to be executed. The gradation correction mode will be described in detail with reference to FIG. 9, and the visual adjustment mode will be described in detail with reference to FIG. 8.

Figure 3:
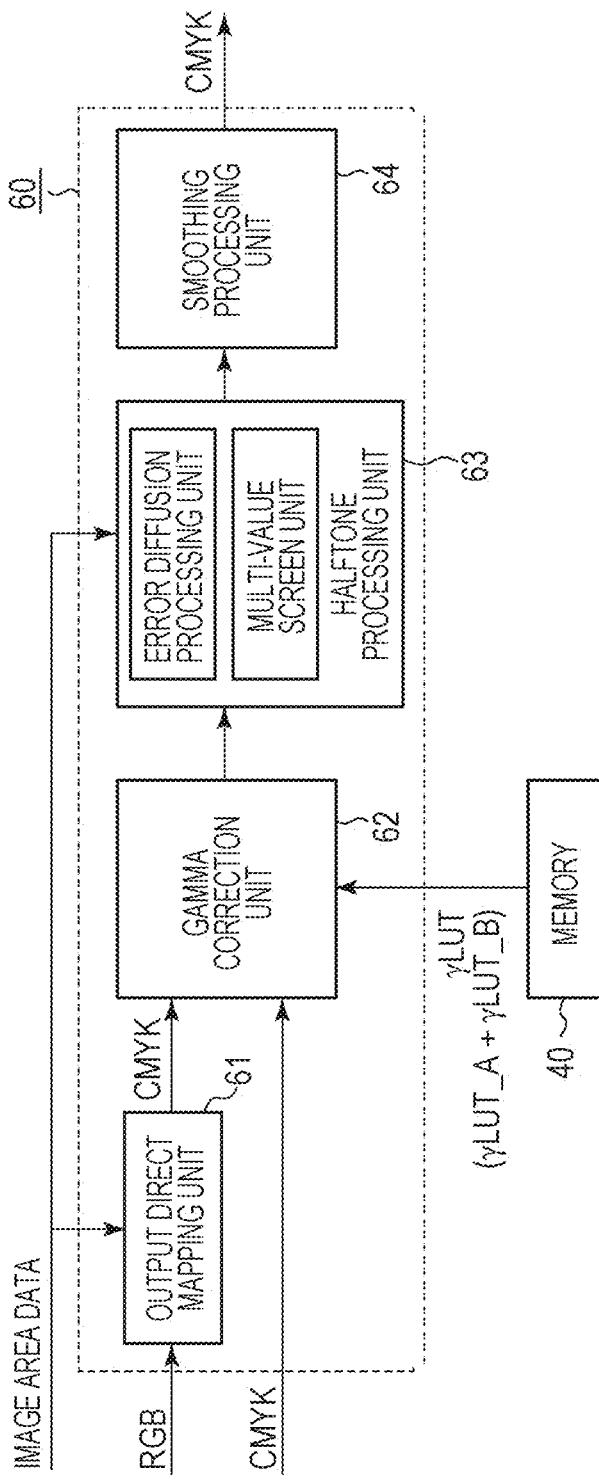
FIG. 3 is a functional block diagram of an image processing unit.

The function of the image processing unit 60 will be described with reference to the functional block diagram in FIG. 3. Image data input to the image processing unit 60 includes RGB data where the three color components of R (red), G (green), and B (blue) are expressed as numerical values, and CMYK data where the four color components are C (cyan), M (magenta), Y (yellow), and K (black). An output direct mapping unit 61 converts RGB data into CMYK data in a case where RGB data and image region data are transferred from the control unit 30 to the image processing unit 60.

A gamma correction unit 62 corrects gradation characteristics of the image data. The density of images formed by the image forming apparatus are not the desired density. Accordingly, the gamma correction unit 62 corrects input signal values of the image data so that the density of the image formed by the image forming apparatus is the desired density. The gamma correction unit 62 corrects the gradation characteristics of image data (CMYK data) based on a gamma LUT_A and a gamma LUT_B sorted in the memory 40. Note that a gamma LUT_A and a gamma LUT_B are stored in the memory 40 for each color component. The gamma LUT_A and a gamma LUT_B correspond to gradation correction tables for correcting input signal values of image data into output signal values.

In a case where the image forming apparatus operates under a predetermined environmental condition, and also a standard state which is a predetermined developing agent charge amount, the gamma LUT_A is a first correction condition for correcting the density of the image formed by the image forming apparatus. The gamma LUT_A is determined by experimentation. The density of images formed by the image forming apparatus changes depending on the ambient temperature and humidity around the image forming apparatus, the number of images formed, the developing agent charge amount, and so forth. Accordingly, the image forming apparatus has the gamma LUT_B for correcting the correction results by the gamma LUT_A in accordance with the state of the image forming apparatus. The gamma LUT_B is a second correction condition for correcting the image data converted based on the gamma LUT_A into image data suitable for the current state of the image forming apparatus. The gamma LUT_B is corrected as appropriate in accordance with the current state of the image forming apparatus. Accordingly, the image forming apparatus has the gradation correction mode to update the gamma LUT_B.

A halftone processing unit 63 subjects the image data (CMYK data) corrected by the gamma correction unit 62 to screening suitable for image region data. Accordingly, the multi-value data of the image data (CMYK data) at each pixel is converted into binary data at each pixel. For example, screening is performed using a dithering matrix, so that text regions are printed clearly. Photograph image regions are subjected to screening using error diffusion so that moiré occurs less readily, for example. Screening is a known technology, so detailed description will be omitted.

A smoothing processing unit 64 corrects image data so that unevenness at the edge portion of the image is smoothed. The smoothing processing unit 64 extracts the edge portion of the image by pattern matching, and selectively converts the data at the edge portion of the image that has been extracted. The image data corrected by the smoothing processing unit 64 is transferred to the exposing device 3 of the image forming station 10. The exposing device 3 is controlled based on the image data converted by the image processing unit 60. The light of the exposing device 3 exposes the photosensitive drum 1, and an electrostatic latent image based on the image data is formed on the photosensitive drum 1.

Figure 4:
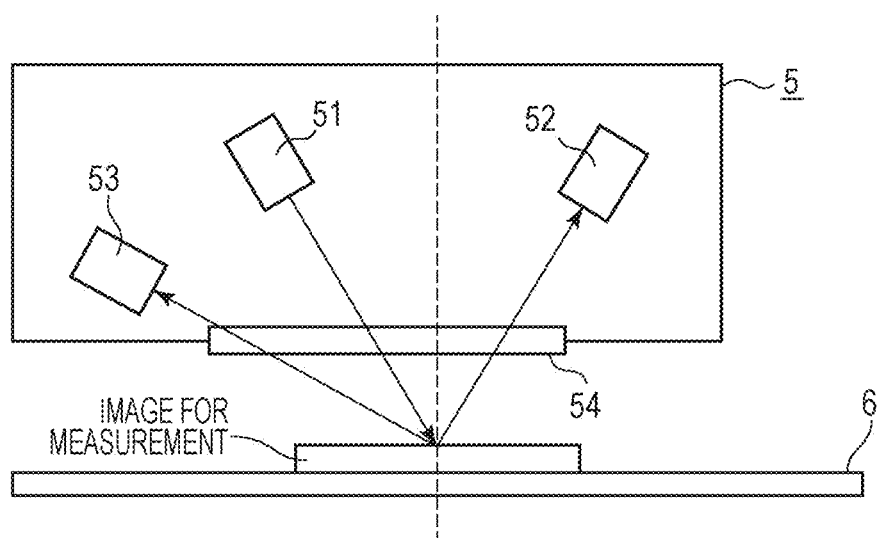
FIG. 4 is a schematic diagram of principal portions of a density detecting sensor.

Next, the configuration of the density detection sensor 5 provided to the image forming apparatus will be described with reference to FIG. 4. The density detection sensor 5 includes the LED 51, photodiodes 52 and 53, a casing that accommodates an electric circuit board (omitted from illustration) and the aforementioned parts of the density detection sensor 5, and a window 54 provided in the casing. The LED 51 irradiates light on the measuring image on the intermediate transfer belt 6. The wavelength of the light irradiated from the LED 51 is 800 to 850 nm for example, taking into consideration the spectral reflectance of the toner. The photodiode 52 receives light of regular reflectance from the measuring image on the intermediate transfer belt 6. The photodiode 53 receives irregular reflection light from the measuring image on the intermediate transfer belt 6. The photodiodes 52 and 53 output sensor output values (voltage values) corresponding to the intensity of the reflected light from the measuring image.

A method of detecting the density of the measuring image in a case where the measuring image has been formed on the sheet P, based on the sensor output values of the density detection sensor 5, will be described. The sensor output value of the photodiode 52 is used in a case of detecting the density of a black measuring image formed on the sheet P. On the other hand, the sensor output value of the photodiode 53 is used in a case of detecting the density of yellow, magenta, and cyan measuring images formed on the sheet P. The density detection sensor 5 measures the spectral reflection light from the measuring image in a case of measuring the density of the black measuring image, and measures the irregular reflection light from the measuring image in a case of measuring the density of the yellow measuring image, the density of the magenta measuring image, and the density of the cyan measuring image. Description will be made here regarding a case of the density detection sensor 5 measuring the black measuring image formed on the intermediate transfer belt 6 by the image forming station 10K.

The LED 51 of the density detection sensor 5 irradiates light on the intermediate transfer belt 6. The region irradiated by light from the LED 51 corresponds to the measurement position. The photodiode 52 receives reflected light from the measuring image (black) while the measuring image (black) on the intermediate transfer belt 6 passes the measurement position of the density detection sensor 5. The sensor output values (voltage values) output from the photodiode 52 while the photodiode 52 is receiving reflected light from the measuring image (black) corresponds to the amount of toner adhered (adherence amount) in the measuring image (black). That is to say, the sensor output value output from the photodiode 52 is a value that corresponds to the density of the measuring image.

The control unit 30 converts the sensor output values of the photodiode 52 into density value Dblack of the black measuring image, based on conversion table Table_1. The control unit 30 corrects the density value Dblack based on conversion table Table_2. That is to say, the conversion tables Table_1 and Table_2 are a conversion condition for conversion of sensor output values output from the photodiode 52 into density values of the measuring image. Further, the density value corresponds to density data. Note that the conversion table Table_2 is data representing the correlation between the density values before correction and the density values after correction. In a case where the conversion table Table_2 is not changed, the density values before correction and the density values after correction are the same.

The control unit 30 converts the sensor output values into density values, based on both conversion tables Table_1 and Table_2. Accordingly, in a case where the conversion table Table_2 is changed, the density values converted from the sensor output values also change. Accordingly, in a case where the density of the measuring image cannot be detected from the sensor output values with high accuracy, the control unit 30 alters the conversion table Table_2. That is to say, the control unit 30 alters the conversion table Table_2 and changes the conversion condition. Accordingly, the control unit 30 can detect density from the sensor output values with high accuracy, based on the conversion table Table_1 and the altered conversion table Table_2.

In a case where a yellow measuring image is measured, the control unit 30 converts the sensor output values of the photodiode 53 into density values of the yellow measuring image, based on the conversion tables Table_1 and Table_2 corresponding to the yellow measuring image. In the same way, in a case where a magenta measuring image is measured, the control unit 30 converts the sensor output values of the photodiode 53 into density values of the magenta measuring image, based on the conversion tables Table_1 and Table_2 corresponding to the magenta measuring image. In a case where a cyan measuring image is measured, the control unit 30 converts the sensor output values of the photodiode 53 into density values of the cyan measuring image, based on the conversion tables Table_1 and Table_2 corresponding to the cyan measuring image. The memory 40 stores conversion tables Table_1 for four colors and conversion tables Table_2 for four colors beforehand.

Figure 5A:
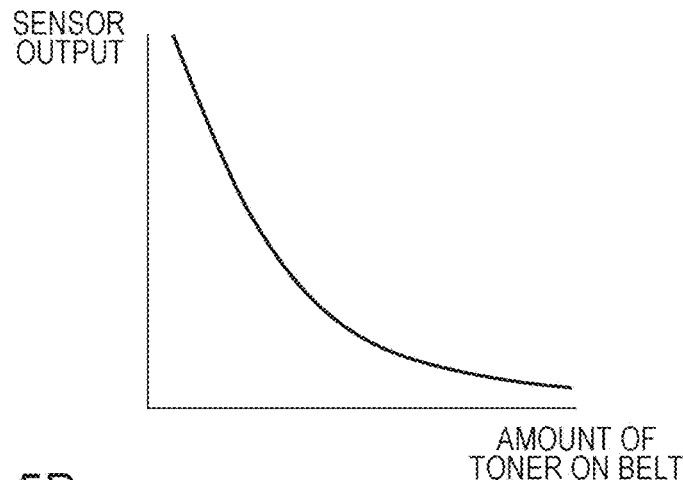
FIGS. 5A through 5C are diagrams describing sensor characteristics.

FIG. 5A is a diagram illustrating the relationship between the amount of toner on the belt for the black measuring image formed on the intermediate transfer belt 6, and the sensor output value of the photodiode 52. The sensor output value of the photodiode 52 decreases as the amount of toner on the belt for the measuring image increases, as illustrated in FIG. 5A. This is because the light irradiated from the LED 51 is absorbed by the black measuring image, so the more the amount of toner adhered for the black measuring image increases, the lower the intensity of regular reflection light received at the photodiode 52 is.

Figure 5B:
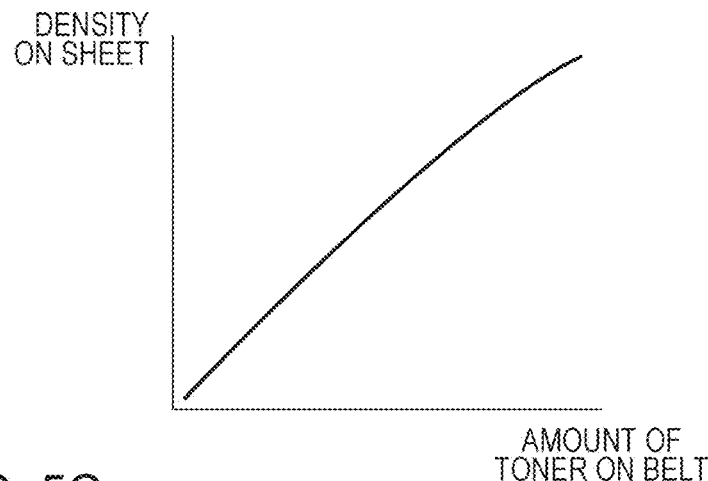
Figure 5C:
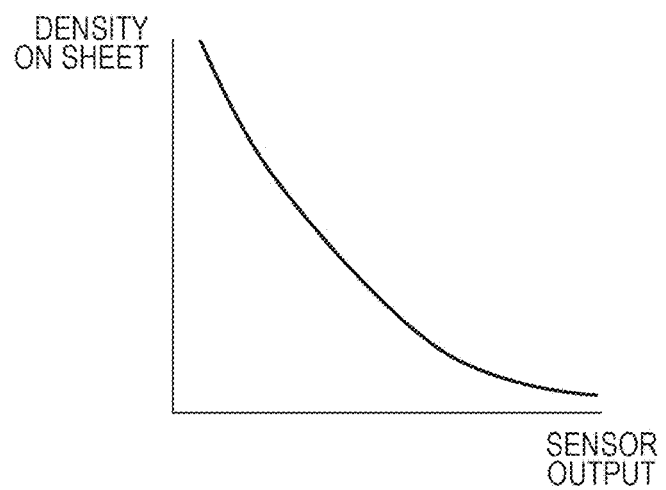

FIG. 5B is a diagram illustrating the relationship between the amount of toner on the belt for the measuring image, and the density of the measuring image when the measuring image is formed on a sheet (on-sheet density). The more the amount of toner on the belt for the measuring image formed on the intermediate transfer belt 6 increases, the darker the density of the measuring image formed on the sheet is. FIG. 5C is a diagram illustrating the relationship between the sensor output value of the photodiode 52 corresponding to the reflection light from the measuring image on the intermediate transfer belt 6, and the density of the measuring image when the measuring image is formed on a sheet (on-sheet density). The data illustrated in FIG. 5C corresponds to the conversion table Table_1 for converting the sensor output values corresponding to the black measuring image into the density values Dblack. The correlation between the sensor output values and the on-sheet density in FIG. 5C is determined beforehand by experimentation. The conversion table Table_1 is set according to the correlation in FIG. 5C, and stored in the memory 40 beforehand.

In the description above, one or other of the sensor output value of the photodiodes 52 and 53 was used for detecting on-sheet density of the measuring image. However, a configuration may be made where intermediate data is determined based on both of the sensor output value of the photodiode 52 and the sensor output value of the photodiode 53, and this intermediate data is converted into on-sheet density. In a case of this configuration, the intermediate data is the difference between the sensor output value of the photodiode 52, and the sensor output value of the photodiode 53 multiplied by a coefficient. The coefficient is determined beforehand for each color. The control unit 30 can detect the on-sheet density of the measuring image by referencing conversion data for converting the intermediate data into on-sheet density of the measuring image.

Now, in a case where toner or paper dust adheres to the window 54 of the density detection sensor 5, error occurs in the sensor output value. This is because, in a case where toner or paper dust adheres to the window 54, the amount of light irradiated from the LED 51 to the measuring image decreases, and the intensity of reflected light that the photodiodes 52 and 53 receive decreases. In a case where toner or paper dust adheres to the window 54, error occurs in the sensor output values of the photodiodes 52 and 53, so the on-sheet density of the measuring image cannot be detected with high accuracy.

In a case where the surface of the intermediate transfer belt 6 is rough due to having formed a great number of images, the correlation between the sensor output value of the measuring image on the intermediate transfer belt 6 and the on-sheet density of the measuring image changes. In a case where the surface of the intermediate transfer belt 6 is rough, the reflection light from the surface of the intermediate transfer belt 6 changes. Accordingly, error occurs in the sensor output value particularly in cases of measuring a low-density measuring image where the toner coverage is low. In a case where the surface of the intermediate transfer belt 6 is rough, error occurs in the sensor output values of the photodiodes 52 and 53, so the on-sheet density of the measuring image cannot be detected with high accuracy.

The proportion of toner transferred from the intermediate transfer belt 6 onto the sheet P at the secondary transfer nip T2 (transfer efficiency) changes depending on the temperature and humidity around the image forming apparatus. Accordingly, in a case where the temperature and humidity around the image forming apparatus changes, there has been a possibility of the relationship between the amount of toner of the measuring image formed on the intermediate transfer belt 6 and the density of the measuring image formed on the sheet P (on-sheet density) changing. Further, the proportion of toner transferred from the intermediate transfer belt 6 onto the sheet P at the secondary transfer nip T2 (transfer efficiency) changes depending in a case where the secondary transfer roller pair 9 has deteriorated over time. This is because the resistance value of the secondary transfer roller pair 9 changes by deteriorating over time. That is to say, there has been a possibility of the relationship between the amount of toner of the measuring image formed on the intermediate transfer belt 6 and the density of the measuring image formed on the sheet P (on-sheet density) changing in a case where the secondary transfer roller pair 9 has deteriorated over time, as well. Accordingly, in a case where the transfer efficiency has changed, the correlation between the sensor output values and the on-sheet density differs from the correlation set beforehand, so the on-sheet density of the measuring image cannot be detected with high accuracy.

Accordingly, the control unit 30 alters the conversion table Table_2 based on the density information of the measuring image formed on the sheet P and the sensor output value of the measuring image, in order to detect the on-sheet density of the measuring image with high accuracy based on the measurement results of the measuring image formed on the intermediate transfer belt 6. Thus, the altered conversion table Table_2 reduces the measurement error of the density detection sensor 5 even if the window 54 of the density detection sensor 5 is soiled, so measurement results of the measuring image can be compensated with high accuracy. Further, even in a case where the surface of the intermediate transfer belt 6 is rough, the altered conversion table Table_2 reduces the measurement error of the density detection sensor 5, so measurement results of the measuring image can be compensated with high accuracy. Further, even in a case where the transfer efficiency changes, the altered conversion table Table_2 converts the sensor output values into on-sheet density of the measuring image with high accuracy, so the on-sheet density of the measuring image can be detected with high accuracy.

Figure 6A:
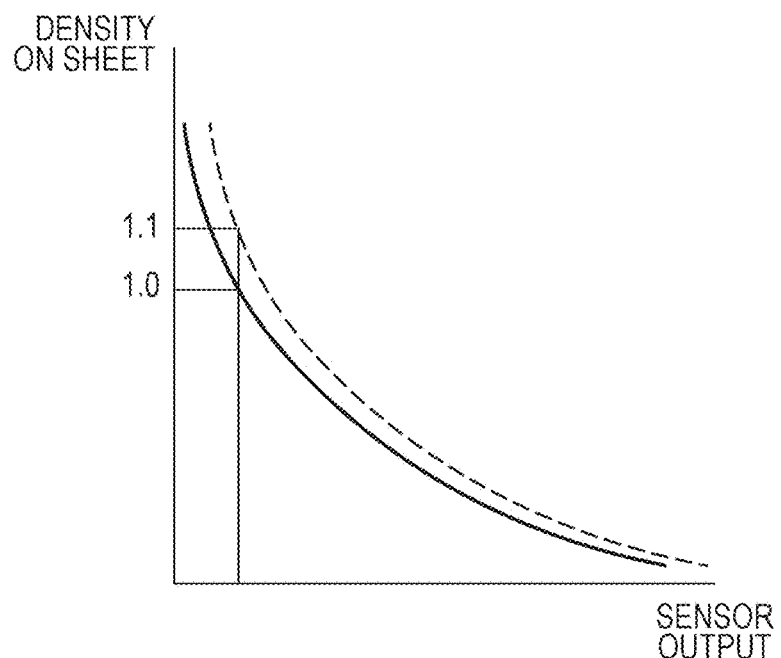
FIGS. 6A and 6B are diagrams illustrating how sensor characteristics are corrected.

FIG. 6A is a diagram illustrating characteristics of the photodiode 52 in a state where the window 54 of the density detection sensor 5 is not soiled, and the characteristics of the photodiode 52 in a state where the window 54 of the density detection sensor 5 is soiled. The dotted line in FIG. 6A represents the characteristics regarding the sensor output value of the photodiode 52 and the on-sheet density in a state where the window 54 of the density detection sensor 5 is not soiled. The solid line in FIG. 6A represents the characteristics regarding the sensor output value of the photodiode 52 and the on-sheet density in a state where the window 54 of the density detection sensor 5 is soiled.

In a case where the window 54 of the density detection sensor 5 is soiled, the amount of light of the LED 51 decreases, and the amount of light received by the photodiodes 52 and 53 decreases. Accordingly, the density as to the sensor output value of the photodiode 52 decreases as illustrated in FIG. 6A. For example, in a case where a measuring image of sensor output value Vx was formed on the sheet P in a state where the window 54 of the density detection sensor 5 was not soiled, the on-sheet density of this measuring image was 1.1. In a case where a measuring image of sensor output value Vx was formed on the sheet P in a state where the window 54 of the density detection sensor 5 was soiled, the on-sheet density of this measuring image was 1.0. The reason is that the characteristics of the sensor output value of the photodiode 52 and the on-sheet density changed. Note that the smaller the amount of toner adhering in the measuring image is, the less the amount of light received by the photodiode 52 is, so error in the sensor output value decreases.

Figure 6B:
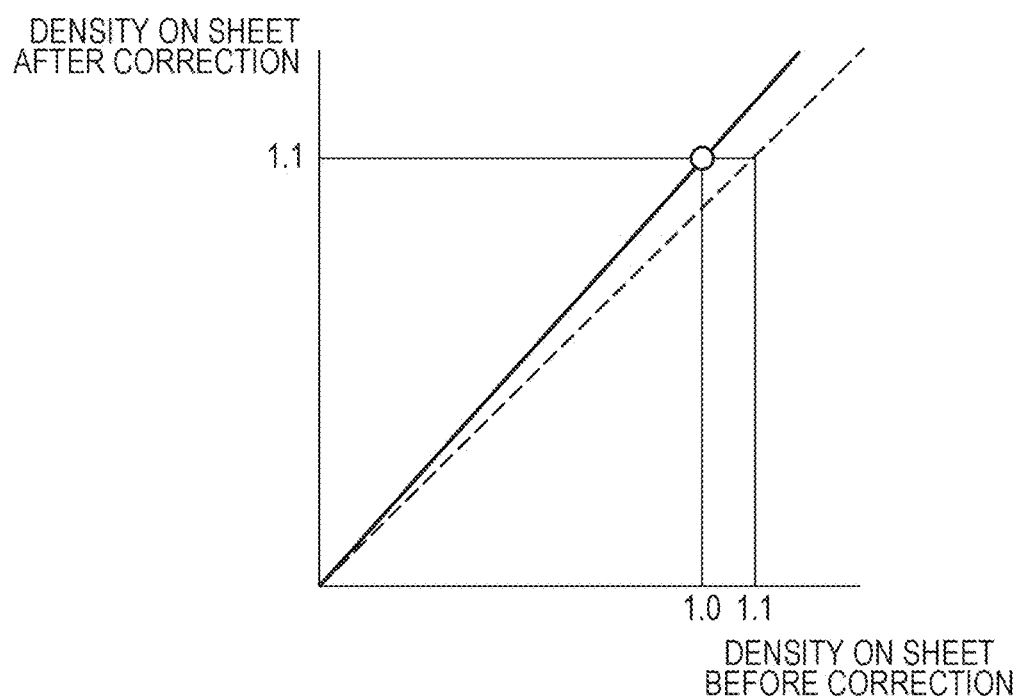

FIG. 6B is a diagram illustrating a graph for the conversion table Table_2 in a state where the window 54 of the density detection sensor 5 is not soiled, and a graph for the conversion table Table_2 altered after the window 54 of the density detection sensor 5 was soiled. The dotted line in FIG. 6B represents a graph of the conversion table Table_2 in a state where the window 54 of the density detection sensor 5 is not soiled. The solid line in FIG. 6B represents a graph of the altered conversion table Table_2. In a case where the characteristics of the sensor output value of the density detection sensor 5 and the on-sheet density change as illustrated in FIG. 6A, the conversion table Table_2 becomes a correction function where the density 0 before correction is density 0 and also the density 1.0 is density 1.1 after correction. That is to say, a correction function that multiples the on-sheet density by 1.1 times is obtained. The data obtained by tabulating this correction function is the conversion table Table_2.

Figure 7A:
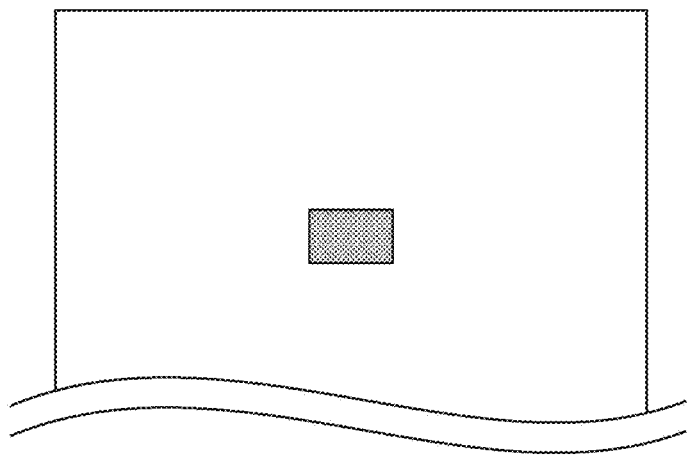
FIG. 7A is a schematic diagram of a test image formed on a sheet.
Figure 7B:
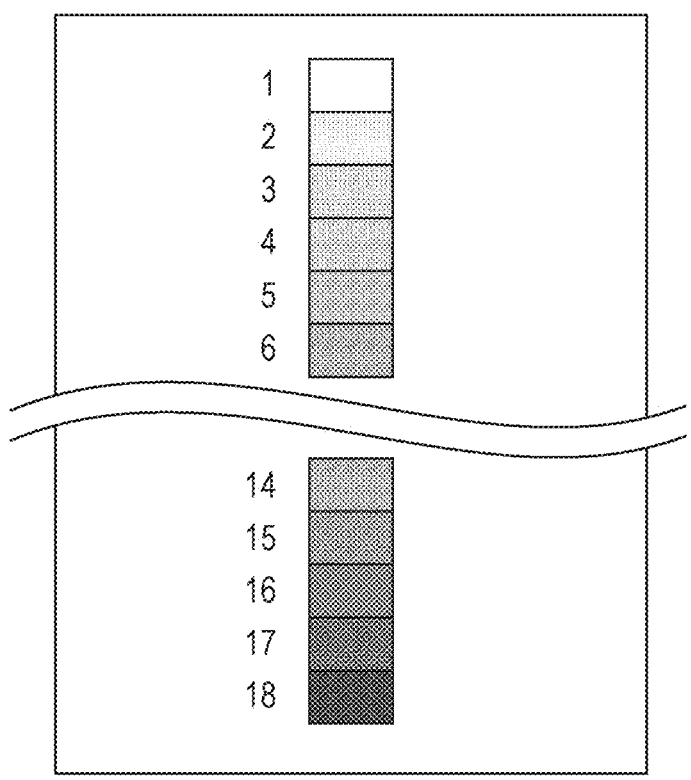
FIG. 7B is a schematic diagram of a sample chart.
Figure 8:
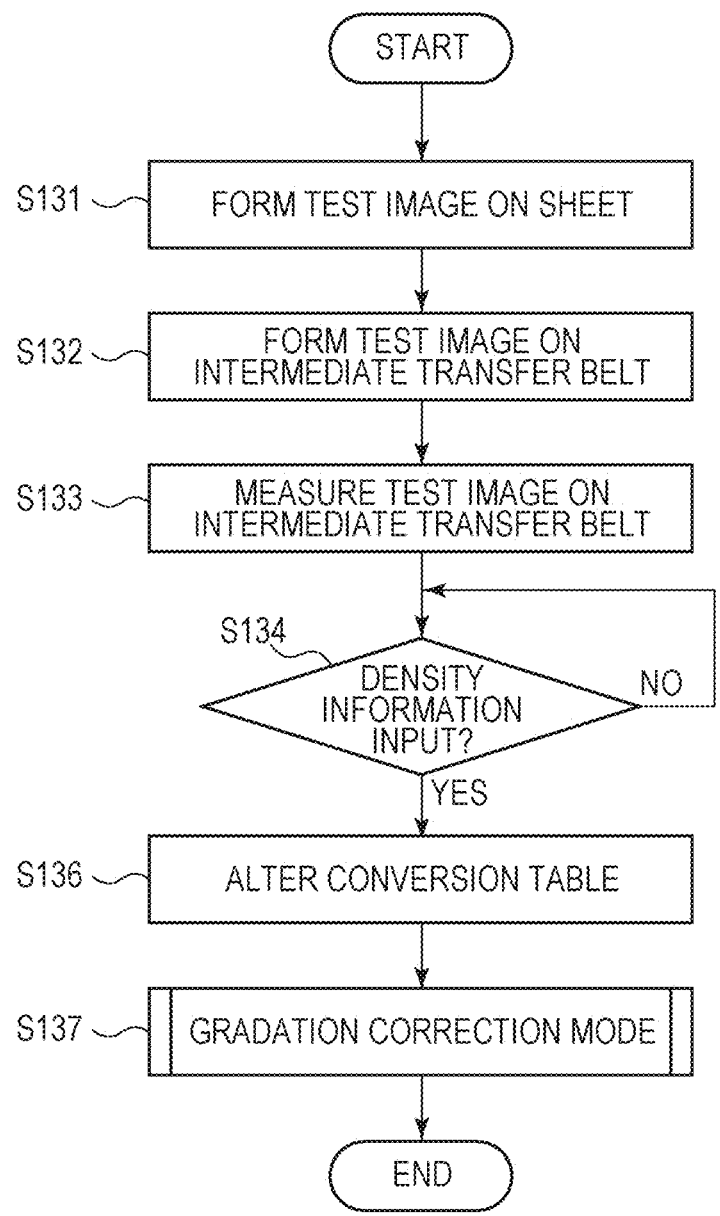
FIG. 8 is a flowchart of a visual adjustment mode.

Next, the visual adjustment mode where the conversion table Table_2 is updated will be described based on FIGS. 7A through 8. FIG. 7A is a schematic diagram of a test image serving as a measuring image that is formed on the sheet P by the image forming station 10, in a case where the visual adjustment mode is executed. FIG. 7B is a sample chart prepared beforehand. The sample chart has images of 18 gradients from density 0.1 through 1.8 in increments of 0.1, and numbers 1 through 18 to the side of the images. The user visually determines which image in the sample chart is closest in density to the test image of which an image is output, and inputs the number given to the sample chart image to the operating unit 80. For example, in a case where the density of the image #10 in the sample chart is the closest to the density of the test image, the user inputs "10" from the numeric keypad of the operating unit 80. Accordingly, the control unit 30 acquires the density of the image. That is to say, the control unit 30 receives user instructions based on the result of the user having made comparison between the sample image and test image. The number input from the operating unit 80 corresponds to density information of the test image. The identification information received from the control unit 30 corresponds to user instructions based on comparison results.

The operations of the units of the image forming apparatus in a case where the visual adjustment mode is executed will be described with reference to the flowchart in FIG. 8. The visual adjustment mode is executed by the control unit 30, by the user pressing the mode selection button on the operating unit 80. The control unit 30 executes the visual adjustment mode in FIG. 8 based on a program stored in read-only memory (ROM).

The control unit 30 first controls the gamma correction unit 62 to correct test image data based on the gamma LUT, and controls the image forming station 10 to form a test image based on the corrected test image data on a sheet P (S131). The control unit 30 controls the image forming station 10 to form the test image on the intermediate transfer belt 6 (S132). In step S131 and step S132, the image forming station 10 serves as an image forming unit that forms test images. The intermediate transfer belt 6 corresponds to an image bearing member where the test image is borne.

The control unit 30 measures the test image on the intermediate transfer belt 6 using the density detection sensor 5 (S133). In step S133, the control unit 30 converts the sensor output value of the density detection sensor 5 into density, based on the conversion table Table_1, and stores the density in the memory 40. Although two test images were formed at the image forming station 10 in steps S131 through step S133, a configuration may be made where only one test image is formed. In a case of this configuration, the density detection sensor 5 may measure the test image on the intermediate transfer belt 6 before transferring the test image onto the sheet P.

The control unit 30 stands by until density information is input from the operating unit 80 (S134). Upon the user inputting density information using the operating unit 80, the control unit 30 analyzes the density information and determines the on-sheet density of the test image, and alters the conversion table Table_2 (S136). The control unit 30 stores the altered conversion table Table_2 in memory 40 and updates the conversion table Table_2, and thereafter transitions to the gradation correction mode (S137) and the visual adjustment mode ends. Thus, the conversion condition for converting the measurement results of the density detection sensor 5 is generated.

Next, the gradation correction mode executed in step S137 in FIG. 8 will be described with reference to FIG. 9. The control unit 30 executes the gradation correction mode based on a program stored in ROM.

When the gradation correction mode is executed, the image forming station 10 forms a pattern image on the intermediate transfer belt 6 (S100). In step S100 the control unit 30 controls the pattern generator 70 to output pattern image data, and controls the gamma correction unit 62 to correct the pattern image data based on the gamma LUT_A stored in the memory 40 beforehand. The image forming station 10 forms a nine-gradient pattern image on the intermediate transfer belt 6, based on the pattern image data corrected by the gamma correction unit 62. The image forming station 10 functions as an image forming unit that forms the pattern image in step S100.

Figure 10:
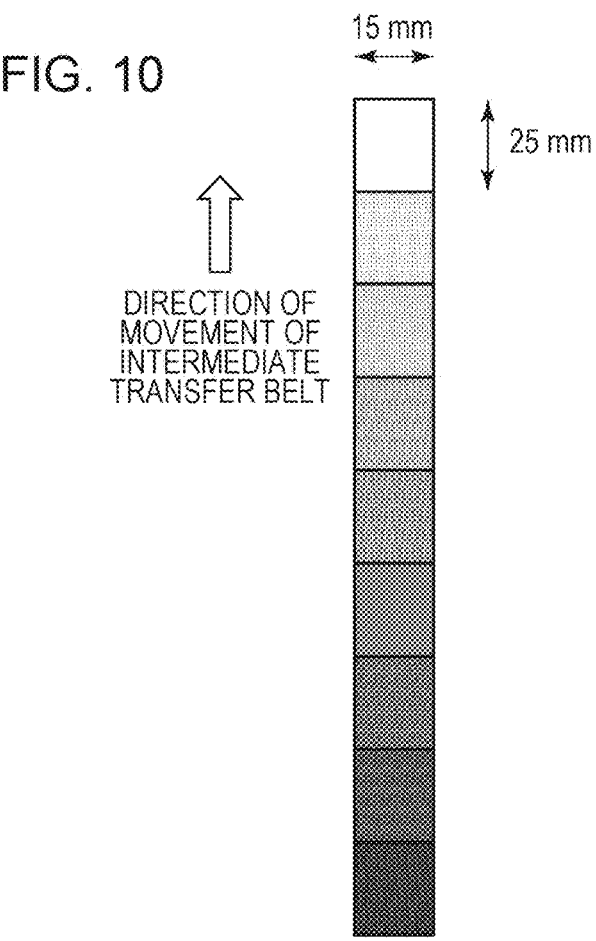
FIG. 10 is a schematic diagram of a pattern image on an intermediate transfer belt.

FIG. 10 is a schematic diagram of the pattern image formed on the intermediate transfer belt 6. The pattern image includes pattern images of nine gradients of differ density. One pattern image is formed having a size 25 mm in the conveyance direction of the intermediate transfer belt 6, and 15 mm in the direction orthogonal to the conveyance direction. The intermediate transfer belt 6 corresponds to the image bearing member bearing the pattern image.

The control unit 30 measures the pattern image using the density detection sensor 5 (S101). In step S101, the density detection sensor 5 outputs sensor output values every 2 msec while the pattern image is passing the measurement position, and measures one pattern image 25 times. The control unit 30 excludes the largest value of the sensor output values and the smallest value of the sensor output values, out of the 25 times worth of sensor output values, and averages the 23 times worth of sensor output values. The control unit 30 then references both the conversion table Table_1 and the conversion table Table_2 stored in the memory 40, to convert the average value of the sensor output values into the on-sheet density.

The control unit 30 corrects the gamma LUT_B based on the on-sheet density measured in step S101 and a target on-sheet density stored in the memory 40 (S102). The on-sheet density is the target value of on-sheet density of the pattern image. Nine gradients of pattern images are formed, so nine target on-sheet densities are set. The method for correcting the gamma LUT_B in step S102 so that the on-sheet density of the pattern image is the target on-sheet density is known technology, so description will be omitted here.

Figure 9:
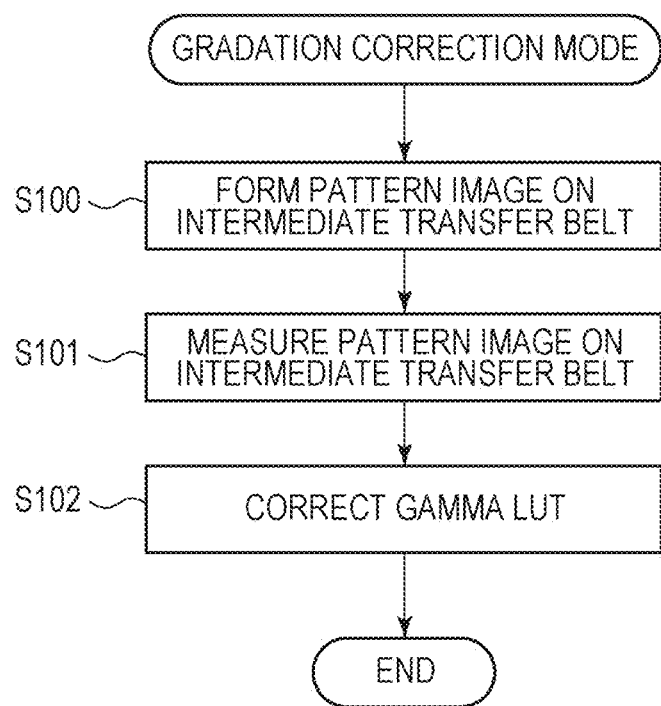
FIG. 9 is a flowchart of a gradation adjustment mode.

In a case where the number of images printed after the gradation correction mode was performed the last time has exceeded a threshold value, for example, or the user has used the mode selection button to instruct execution of the gradation correction mode, the image forming apparatus executes gradation correction mode in FIG. 9. This updates the gamma LUT_B, so an image with proper density can be formed.

The conversion table Table_2 is altered based on the density information of the test image input by visual inspection by the user, and the sensor output value of the density detection sensor 5. Thus, the image forming apparatus can reduce the measurement error of the density detection sensor 5, and measurement results can be compensated with high accuracy. Further, the image forming apparatus corrects the gamma LUT based on the measurement results of a pattern image by the density detection sensor 5, that has been converted based on the altered conversion table Table_2. Accordingly, the image forming apparatus can correct the density characteristics of the image formed on the sheet by the image forming apparatus with high accuracy.

The above-described control unit 30 generates a conversion condition (conversion table Table_1 and conversion table Table_2) based on density data of one test image formed on a sheet P. However, a configuration may be made where the control unit 30 generates a conversion condition (conversion table Table_1 and conversion table Table_2) based on density data of three test images formed on a sheet P. The image forming apparatus described below can generate a highly-accurate conversion condition as compared to a case of generating a conversion condition using one test image. Accordingly, the control unit 30 can correct the density of images formed on sheets with high accuracy, from low density to high density.

The following description will be made in detail regarding points that differ from the above-described image forming apparatus. Description of points that are the same as the above-described image forming apparatus will be omitted in the following description.

Figure 11:
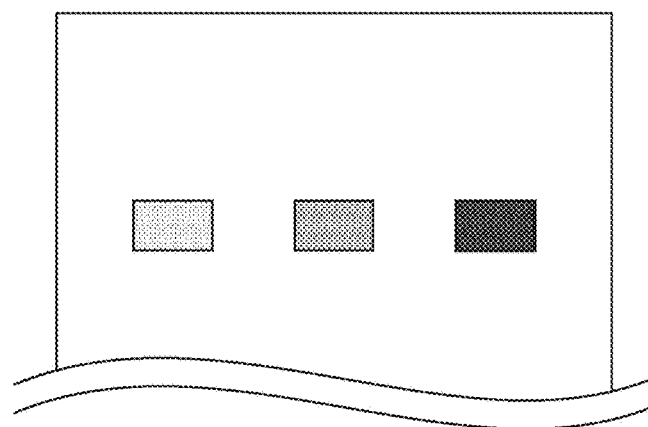
FIG. 11 is a schematic diagram of a test image formed on a sheet.
Figure 12:
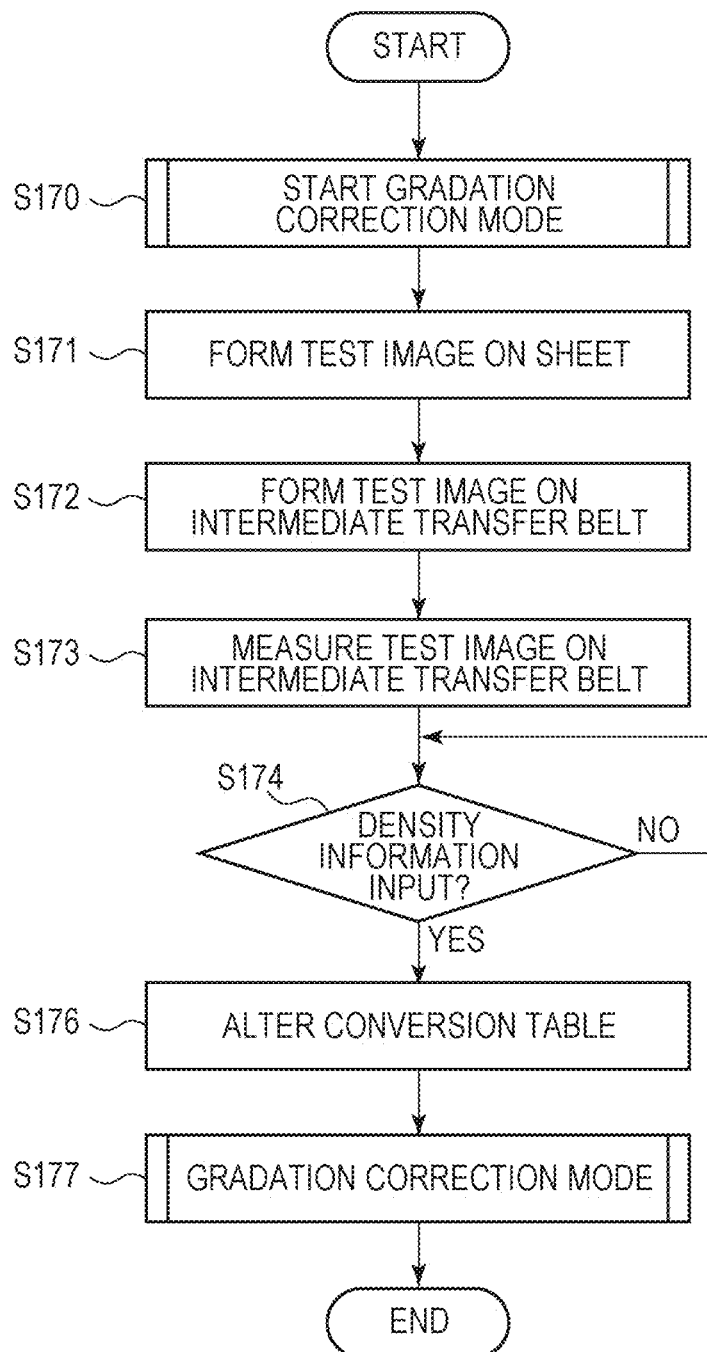
FIG. 12 is a flowchart of a visual adjustment mode.

Next, the visual recognition mode will be described with reference to FIGS. 11 and 12. FIG. 11 is a schematic diagram of a test image serving as a measuring image, formed on the sheet P by the image forming station 10 in a case where the visual recognition mode is executed. The sample chart has been described in FIG. 7B, so description will be omitted here. The user determines visually which number image on the sample chart is the closest in density to the test image that has been output, and inputs the number given to the image by the operating unit 80. The test image illustrated in FIG. 11 has test image A, test image B, and test image C. The target density of the test image A (e.g., 0.4), the target density of the test image B (e.g., 0.8), and the target density of the test image C (e.g., 1.2) differ from each other. That is to say, the test image A, test image B, and test image C are each formed based on test image data of different signal values. The user inputs from the operating unit 80 the number of the image closest to the density of the test image A, the number of the image closest to the density of the test image B, and the number of the image closest to the density of the test image C.

The operations of the units of the image forming apparatus in a case where the visual adjustment mode is executed will be described with reference to the flowchart in FIG. 12. The visual adjustment mode is executed by the control unit 30, by the user pressing the mode selection button on the operating unit 80. The control unit 30 executes the visual adjustment mode in FIG. 12 based on a program stored in ROM.

First, the control unit 30 executes the gradation correction mode (S170). Note that the control unit 30 stores sensor output values of pattern images in the memory 40 in step S170. Next, the control unit 30 controls the gamma correction unit 62 to correct test image data based on the gamma LUT, and controls the image forming station 10 to form test images A, B, and C, based on the corrected test image data, on a sheet P (S171). The control unit 30 controls the image forming station 10 to form the test images A, B, and C, on the intermediate transfer belt 6 (S172). In step S171 and step S172, the image forming station 10 serves as an image forming unit that forms the test images A, B, and C.

The control unit 30 measures the test images A, B, and C, on the intermediate transfer belt 6 using the density detection sensor 5 (S173). In step S173, the control unit 30 converts the sensor output value of the density detection sensor 5 into density based on the conversion table Table_1, and stores this in the memory 40. Although the test images A, B, and C, were formed twice at the image forming station 10 in steps S171 through step S173, a configuration may be made where the test images A, B, and C, are formed only once. In a case of this configuration, the density detection sensor 5 may measure the test images A, B, and C, on the intermediate transfer belt 6 before transferring the test images A, B, and C, onto the sheet P.

The control unit 30 stands by until density information is input from the operating unit 80 (S174). Upon the user inputting density information using the operating unit 80, the control unit 30 alters the conversion table Table_2 (S176). The control unit 30 analyzes the density information input at the operating unit 80 in step S174, and determines the on-sheet density of the test images A, B, and C. The control unit 30 then updates the conversion table Table_2, based on the determined on-sheet density and the on-sheet density stored in the memory 40 in step S173.

After having executed the gradient correction mode (S177), the control unit 30 ends the visual adjustment mode. The control unit 30 converts the measurement results of the pattern image based on the altered conversion table Table_2, and updates the gamma LUT based on the converted measurement results. Accordingly, the density characteristics of the image formed on the sheet P by the image forming apparatus is corrected with high accuracy.

Note that instead of executing the gradient correction mode in step S177, the gamma LUT_B may be corrected based on the measurement results of the pattern image stored in the memory 40 in step S170. That is to say, the control unit 30 converts the measurement results of the pattern image stored in the memory 40 in step S170 into on-sheet density, based on the conversion table Table_2 altered in step S176. The gamma LUT_B is then corrected so that the measurement results of the pattern image (on-sheet density) are the target density.

According to this configuration, the image forming station 10 does not form a measuring image for correcting the gamma LUT_B (pattern image) on the intermediate transfer belt 6 again in step S177. Accordingly, consumption of toner can be suppressed in the image forming apparatus as compared to forming a measuring image and correcting the gamma LUT_B, and further downtime can be reduced as well.

After the updating of the gamma LUT_B in step S170, in step S171 both the gamma LUT_A and gamma LUT_B are used to correct test image data, and the test images A, B, and C are formed based on the corrected test image data. The gamma LUT_B is corrected before forming the test image on the sheet P, so the difference between the measurement results of the test image where the test images A, B, and C are formed on the sheet P in step S171 and the target density is reduced. Accordingly, the conversion table Table_2 can be corrected with high accuracy.

That is to say, in a case where the on-sheet density of the test image A is darker than a target density (e.g., 0.4), the low-concentration region of the conversion table Table_2 cannot be corrected with high accuracy. In the same way, in a case where the on-sheet density of the test image C is lighter than a target density (e.g., 1.2), the high-concentration region of the conversion table Table_2 cannot be corrected with high accuracy. This is due to the nature of human eyes, that precision of distinguishing in the high-concentration region is low. Also, difference is not recognizable at higher concentration than the test image C, so the lighter the on-sheet density of the test image C is as to the target density, the more markedly the measurement precision of the measuring image in the high-concentration region deteriorates.

Figure 13:
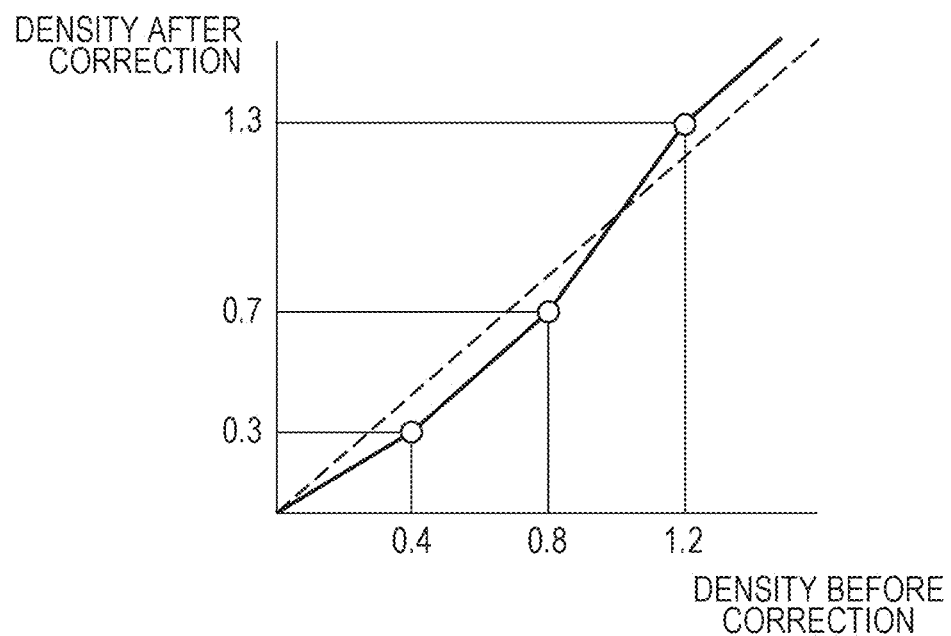
FIG. 13 is an example of conversion table Table_2.

FIG. 13 illustrates a graph of the conversion table Table_2 before correction, and a graph of the conversion table Table_2 after correction. The dotted line in FIG. 13 represents a graph of the conversion table Table_2 before correction. The solid line in FIG. 13 represents a graph of the conversion table Table_2 after correction. Note that in the following description, the density information measured visually by the user was 0.3 for the density of the test image A, 0.7 for the density of the test image B, and 1.3 for the density of the test image C.

In the region where the density before correction is 0 or larger but below 0.4, the control unit 30 determines a correction function 1 to multiply the on-sheet density before correction by ¾. Further, in the region where the density before correction is 0.4 or larger but below 0.8, the control unit 30 determines a correction function 2 to correct the on-sheet density before correction to a value smaller by 0.1. Further, in the region where the density before correction is 0.8 or larger but below 1.2, the control unit 30 determines a correction function 3 to multiply the on-sheet density before correction by 1.5, and further correct to a value smaller by 0.5. Further, in the region where the density before correction is 1.2 or larger, the control unit 30 determines a correction function 4 to correct the on-sheet density before correction to a value larger by 0.1. The control unit 30 stores data where the correction functions 1, 2, 3, and 4 have been tabulated, in the memory 40 as the conversion table Table_2.

The conversion table Table_2 is corrected by density information of test images input by visual inspection of the user, and the sensor output values of the density detection sensor 5. Accordingly, the measurement error of the density detection sensor 5 can be reduced, and highly accurate compensation of measurement results can be performed. Further, the gamma LUT is corrected based on the measurement results by the density detection sensor 5 of the pattern image that has been converted based on the altered conversion table Table_2. Accordingly, the density characteristics of the image formed on the sheet by the image forming apparatus can be corrected with high accuracy.

The conversion table Table_2 is corrected based on the measurement results of multiple test images, so the conversion table Table_2 can be determined with higher accuracy than correcting based on measurement results of one test image. That is to say, this image forming apparatus can generate a conversion table for conversion into density data of the test image formed on the sheet P, from the measurement results of the density detection sensor 5. Accordingly, the density characteristics of the image formed on the sheet P by the image forming apparatus can be corrected with high accuracy, based on measurement results of the pattern image by the density detection sensor 5.

The control unit 30 controls the image forming station 10K to form a black test image, and creates a conversion table Table_2 for black, based on the measurement results of the black test image by the density detection sensor 5 and user instructions. However, a configuration may be made where the control unit 30 generates a conversion tables Table_2 that converts the measurement results of yellow, magenta, cyan, and black measuring images in a case where the visual adjustment mode is executed. In this case, the image forming stations 10Y, 10M, 10C, and 10K each form test images, and the control unit 30 creates conversion tables Table_2 for each color.

A configuration has been described where the density detection sensor 5 measures measuring images formed on the intermediate transfer belt 6. However, the density detection sensor 5 may be configured to be provided to each of the photosensitive drums 1Y, 1M, 1C, and 1K. The photosensitive drums 1Y, 1M, 1C, and 1K correspond to an image bearing member that bears pattern images and test images.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2015-060145, filed Mar. 23, 2015, which is hereby incorporated by reference herein in its entirety.

What is claimed is:

1. An image forming apparatus comprising:
a tone correction unit configured to correct image data based on a tone correction condition;
an image forming unit configured to form an image based on the corrected image data;
an image bearing member configured to bear the image formed by the image forming unit;
a transfer unit configured to transfer the image on the image bearing member onto a sheet;
a sensor configured to measure a measuring image on the image bearing member;
a receiving unit configured to receive a user instruction; and
a controller configured to execute:
　a first measuring task that controls the image forming unit to form the measuring image on the image bearing member, and controls the sensor to measure the measuring image;
　a converting task that converts the measurement result of the measuring image measured in the first measuring task, based on a conversion condition;
　a first generating task that generates the tone correction condition based on the measurement result converted in the converting task;
　a test image forming task that controls the image forming unit to form a test image based on test image data, controls the transfer unit to transfer the test image on the image bearing member onto the sheet;
　a second measuring task that controls the sensor to measure the test image, which is formed by the image forming unit, on the bearing member;
　a receiving task that receives, using the receiving unit, a comparison information included in the user instruction, the comparison information corresponding to information related to a result of a user having compared a sample image and the test image transferred onto the sheet; and
　a second generating task that adjusts the conversion condition, based on the comparison information and a measurement result of the test image in the second measuring task, and adjusts the tone correction condition based on the measurement result converted with the adjusted conversion condition.

2. The image forming apparatus according to claim 1, wherein the sample image includes a plurality of sample images with different densities, and identifying information corresponding to the plurality of sample images,
and wherein the comparison information corresponds to the identifying information input by the user.

3. The image forming apparatus according to claim 1, further comprising:
a fixing unit configured to fix the image onto the sheet, wherein the controller, in the test image forming task, controls the fixing unit to fix the test image on the sheet.

4. The image forming apparatus according to claim 1, wherein the controller, in the second measuring task, controls the tone correction unit to correct the test image data based on the tone correction condition, and controls the image forming unit to form the test image based on the corrected test image data.

5. The image forming apparatus according to claim 1, wherein the controller, in the test image forming task, controls the tone correction unit to correct the test image data based on the tone correction condition, controls the image forming unit to form the test image based on the corrected test image data, and controls the transfer unit to transfer the test image on the image bearing member onto the sheet.

6. The image forming apparatus according to claim 1, wherein the test image includes a plurality of test images of different densities.

7. The image forming apparatus according to claim 1, wherein the tone correction condition is a gradation correction table for correcting gradation characteristics of an image to be formed by the image forming unit.

8. The image forming apparatus according to claim 1, wherein the sensor includes
　an irradiating unit configured to irradiate light on the measuring image, and
　a photoreceptor unit configured to receive light reflected from the measuring image.

9. The image forming apparatus according to claim 1, wherein the image forming unit includes
　a first image forming unit that forms an image of a first color, and
　a second image forming unit that forms an image of a second color that is different from the first color,
wherein the test image includes
　a first test image formed by the first image forming unit, and
　a second test image formed by the second image forming unit,
wherein the tone correction condition includes
　a first tone correction condition corresponding to an image of the first color, and
　a second tone correction condition corresponding to an image of the second color,
wherein the conversion condition includes
　a first conversion condition corresponding to a measuring image of the first color, and
　a second conversion condition corresponding to a measuring image of the second color, and
wherein the controller, in the second generating task, generates the conversion condition of the first color and the conversion condition of the second color.

10. The image forming apparatus according to claim 1, wherein the controller, in the converting task, converts the measurement result of the measuring image measured in the first measuring task into density data based on the conversion condition.

11. A control method of an image forming apparatus including
an image bearing member,
a tone correction unit configured to correct image data based on tone correction condition,
an image forming unit configured to form an image on the image bearing member based on the image data corrected by the tone correction unit,
a transfer unit configured to transfer the image on the image bearing member onto a sheet,
a sensor configured to measure a measuring image on the image bearing member, and
a receiving unit configured to receive a user instruction, the method comprising:

a first measuring step to form the measuring image by the image forming unit, and measure the measuring image formed on the image bearing member using the sensor;

a converting step to convert measurement result of the measuring image by the sensor based on a conversion condition;

a first generating step to generate the tone correction condition based on the measurement result converted in the converting step;

a test image forming step to form a test image by the image forming unit, and transfer the test image on the image bearing member onto the sheet using the transfer unit;

a second measuring step to measure the test image, which is formed by the image forming unit, formed on the image bearing member using the sensor;

a receiving step to receive, using the receiving unit, a comparison information included in the user instruction, the comparison information corresponding to information related to comparison results of the user having compared a sample image and the test image transferred onto the sheet; and a second generating step to adjust the conversion condition, based on the comparison information and a measurement result of the test image in the second measuring step by the sensor, and to adjust the tone correction condition based on the measurement result converted with the adjusted conversion condition.

12. The control method according to claim 11,
wherein the sample image includes a plurality of sample images with different densities, and identifying information corresponding to the plurality of sample images, and
wherein the comparison information corresponds to the identifying information.

13. The control method according to claim 11,
wherein the tone correction condition is a gradation correction table for correcting gradation characteristics of an image to be formed by the image forming unit.

* * * * *